United States Patent
Zheng et al.

(10) Patent No.: US 11,622,296 B2
(45) Date of Patent: Apr. 4, 2023

(54) DATA SENDING METHOD AND RECEIVING METHOD AND USER EQUIPMENT

(71) Applicant: VIVO MOBILE COMMUNICATION CO., LTD., Dongguan (CN)

(72) Inventors: Qian Zheng, Dongguan (CN);
Xiaodong Yang, Dongguan (CN);
Yanxia Zhang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 157 days.

(21) Appl. No.: 17/035,502

(22) Filed: Sep. 28, 2020

(65) Prior Publication Data
US 2021/0014730 A1    Jan. 14, 2021

Related U.S. Application Data

(63) Continuation of application No. PCT/CN2019/077793, filed on Mar. 12, 2019.

(30) Foreign Application Priority Data

Mar. 29, 2018    (CN) .......................... 201810272572.3

(51) Int. Cl.
*H04W 28/06*      (2009.01)
*H04L 1/1812*      (2023.01)
(Continued)

(52) U.S. Cl.
CPC ........... *H04W 28/06* (2013.01); *H04L 1/1819* (2013.01); *H04L 1/22* (2013.01); *H04L 69/22* (2013.01); *H04W 72/04* (2013.01); *H04W 80/02* (2013.01)

(58) Field of Classification Search
CPC ........ H04W 28/06; H04L 1/1819; H04L 1/22; H04L 69/22
See application file for complete search history.

(56) References Cited

U.S. PATENT DOCUMENTS

2017/0094656 A1 * 3/2017 Chen ................. H04W 72/0446
2017/0272553 A1 * 9/2017 Yi ......................... H04L 69/324
(Continued)

FOREIGN PATENT DOCUMENTS

| EP | 3282745 A1 | 2/2018 |
| WO | 2016010258 A1 | 1/2016 |
| WO | 2016163655 A1 | 10/2016 |

OTHER PUBLICATIONS

First Office Action issued in related Chinese application No. 201810272572.3, dated Apr. 20, 2020, 6 pages.
(Continued)

*Primary Examiner* — Jamal Javaid
*Assistant Examiner* — Ryan C Kavleski
(74) *Attorney, Agent, or Firm* — IPX PLLC (57) ABSTRACT

This disclosure provides a data sending method and receiving method, and user equipment thereof, and relates to the field of communications technologies. The data receiving method applied to user equipment includes: determining whether a Medium Access Cntrol (MAC) Protocol Data Unit (PDU) received by the user equipment includes a reserved Logical Channel Identity (LCID) value; and when the MAC PDU includes a reserved LCID value, discarding a Service Data Unit (SDU) or sub-PDU corresponding to the reserved LCID value in the MAC PDU.

13 Claims, 6 Drawing Sheets

(51) Int. Cl.
  *H04L 1/22*   (2006.01)
  *H04L 69/22*  (2022.01)
  *H04W 72/04*  (2023.01)
  *H04W 80/02*  (2009.01)

(56) References Cited

U.S. PATENT DOCUMENTS

2018/0316610 A1* 11/2018 Lee .................. H04L 45/74
2019/0373511 A1* 12/2019 Oyman ............. H04W 76/27
2019/0387080 A1* 12/2019 Liu .................... H04L 69/22
2022/0014961 A1*  1/2022 Baek ................. H04W 28/02

OTHER PUBLICATIONS

Ericsson, "MAC PDU discard at split bearer/SCG bearer reconfiguration", 3GPP TSG-RAN WG2#100 Tdoc R2-1714192, Dec. 1, 2017.
Huawei, HiSilicon, "Remaining issues for MAC PDU format in NR", 3GPP TSG-RAN WG2#100 R2-1712781, Dec. 1, 2017.

* cited by examiner

DATA SENDING METHOD AND RECEIVING METHOD AND USER EQUIPMENT

CROSS-REFERENCE TO RELATED APPLICATIONS

This application is a bypass continuation of PCT Application No. PCT/CN2019/077793 filed Mar. 12, 2019, which claims priority to Chinese Patent Application No. 201810272572.3 filed in China on Mar. 29, 2018, both of which are incorporated herein by reference in their entireties.

TECHNICAL FIELD

This disclosure relates to the field of communications technologies, and in particular, to a data sending method and receiving method, and user equipment thereof.

BACKGROUND

A carrier aggregation function at a wireless air interface PC5 (PC5 carrier aggregation, PC5 CA) is introduced for sidelink User Equipment (UE). The UE can perform packet duplication over two PC5 carriers, to further improve data reliability. The sidelink UE performs the data duplication function at the Packet Data Convergence Protocol (PDCP) layer. Duplicated sidelink PDCP Protocol Data Units (PDUs) are submitted to two different Radio Link Control (RLC) entities, respectively. Different RLC entities correspond to different logical channels, and different logical channels have different Logical Channel Identities (LCIDs). In addition, transmission of two duplicated data packets is not supported on a same PC5 carrier. Therefore, when the Medium Access Control (MAC) layer processes duplicated data from different logical channels, the duplicated data need to be transmitted through different Hybrid Automatic Repeat Request (HARQ) entities.

Figure 1:
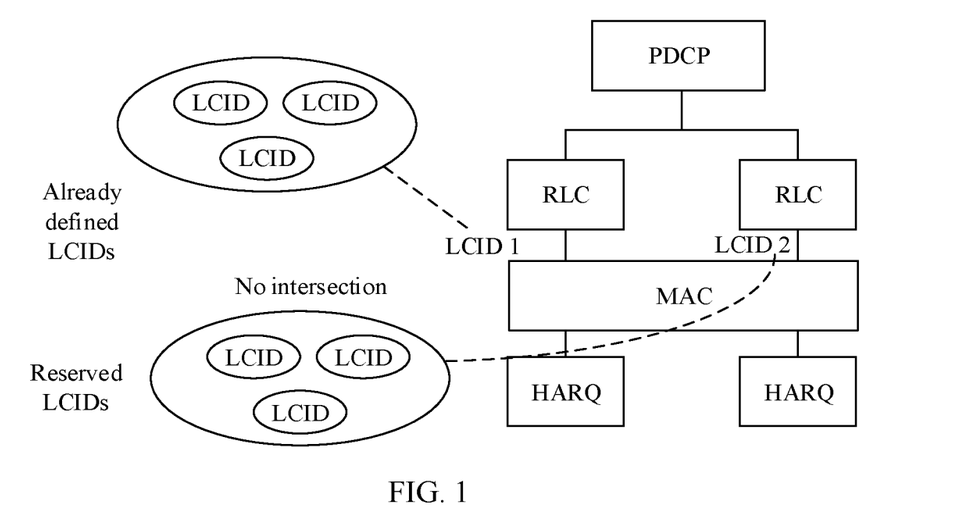
FIG. 1 is a schematic diagram of a sidelink data duplication function.

FIG. 1 is a schematic diagram of a sidelink data duplication function. In FIG. 1, it is stipulated (hard coded) in the protocol that two LCIDs (namely, an LCID 1 and an LCID 2) used for the data packet duplication function are in a fixed one-to-one mapping relationship. For example, the LCID 1 (of legacy LCIDs: 1, 2, . . . , 10) is associated with the LCID 2 (of reserved LCIDs: 11, 12, . . . , 21).

It is described in a MAC protocol in the related art that when a MAC PDU received by sidelink UE includes a reserved or invalid LCID value, the UE discards the received MAC PDU.

In the related art, some R15 UE service data packets need to be received by R14 UE. However, if the duplication function is activated in R15 UE data transmission, the LCID 2 (as shown in FIG. 1) used for duplication is a reserved LCID for the R14 UE, because the R14 UE does not support sidelink packet duplication. Therefore, when the R14 UE detects that a MAC PDU includes the LCID 2, the R14 UE discards the entire MAC PDU according to the MAC protocol in the related art, resulting in a decrease in data reception performance (packet loss) of the R14 UE.

SUMMARY

The technical problem to be resolved in this disclosure is how to provide a data sending method and receiving method, and user equipment thereof, to ensure data reception performance of user equipment.

To resolve the technical problem, the following technical solutions are provided in embodiments of this disclosure.

According to a first aspect, an embodiment of this disclosure provides a data receiving method, applied to user equipment, where the method includes:
   determining whether a MAC PDU received by the user equipment includes a reserved LCID value; and
   when the MAC PDU includes a reserved LCID value, discarding a Service Data Unit (SDU) or sub-PDU corresponding to the reserved LCID value in the MAC PDU.

According to a second aspect, an embodiment of this disclosure provides a data sending method, applied to user equipment, where the method includes:
   determining whether a MAC service data unit SDU is associated with a reserved LCID value;
   when the MAC SDU is associated with a reserved LCID value, placing the MAC SDU in a first MAC PDU, and when the MAC SDU is not associated with the reserved LCID value, placing the MAC SDU in a second MAC PDU; and
   separately sending the first MAC PDU and the second MAC PDU.

According to a third aspect, an embodiment of this disclosure provides user equipment, including:
   a determining module, configured to determine whether a MAC PDU received by the user equipment includes a reserved LCID value; and
   a discarding module, configured to: when the MAC PDU includes a reserved LCID value, discard a SDU or sub-PDU corresponding to the reserved LCID value in the MAC PDU.

According to a fourth aspect, an embodiment of this disclosure provides user equipment, including:
   a determining module, configured to determine whether a MAC SDU is associated with a reserved LCID value;
   an encapsulation module, configured to: when the MAC SDU is associated with a reserved LCID value, place the MAC SDU in a first MAC PDU, and when the MAC SDU is not associated with the reserved LCID value, place the MAC SDU in a second MAC PDU; and
   a sending module, configured to separately send the first MAC PDU and the second MAC PDU.

According to a fifth aspect, an embodiment of this disclosure provides user equipment, including a memory, a processor, and a computer program that is stored in the memory and capable of running on the processor, where when the computer program is executed by the processor, the steps of the data receiving method or the data sending method are implemented.

According to a sixth aspect, an embodiment of this disclosure provides a computer-readable storage medium, where the computer-readable storage medium stores a computer program, and when the computer program is executed by a processor, the steps of the data receiving method or the data sending method are implemented.

The embodiments of this disclosure have the following beneficial effects:

In the foregoing solutions, when the MAC PDU received by the user equipment includes the reserved LCID value, the SDU or sub-PDU corresponding to the reserved LCID value in the MAC PDU instead of the entire MAC PDU is discarded. This does not cause a decrease in data reception performance of the user equipment, thereby ensuring the data reception performance of the user equipment. In addition, when the user equipment sends data, the MAC SDU associated with the reserved LCID value and the MAC SDU not associated with the reserved LCID value are separately sent in two MAC PDUs. This can prevent peer user equipment from discarding the MAC SDU not associated with the reserved LCID value after receiving the MAC PDU including the reserved LCID value, thereby further ensuring the data reception performance of the user equipment. According to the technical solutions in this disclosure, it can be realized that data packet reception performance of the peer user equipment is not affected when the user equipment activates the data packet duplication function to send a service data packet, thereby ensuring backward compatibility and performance of a communications system.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may derive other drawings from these accompanying drawings without creative efforts.

DETAILED DESCRIPTION

To make the to-be-resolved technical problems, technical solutions, and advantages of the embodiments of this disclosure clearer, the following provides detailed descriptions with reference to the accompanying drawings and specific embodiments.

The embodiments of this disclosure provide a data sending method and receiving method, and user equipment, to ensure data reception performance of user equipment.

Figure 2:
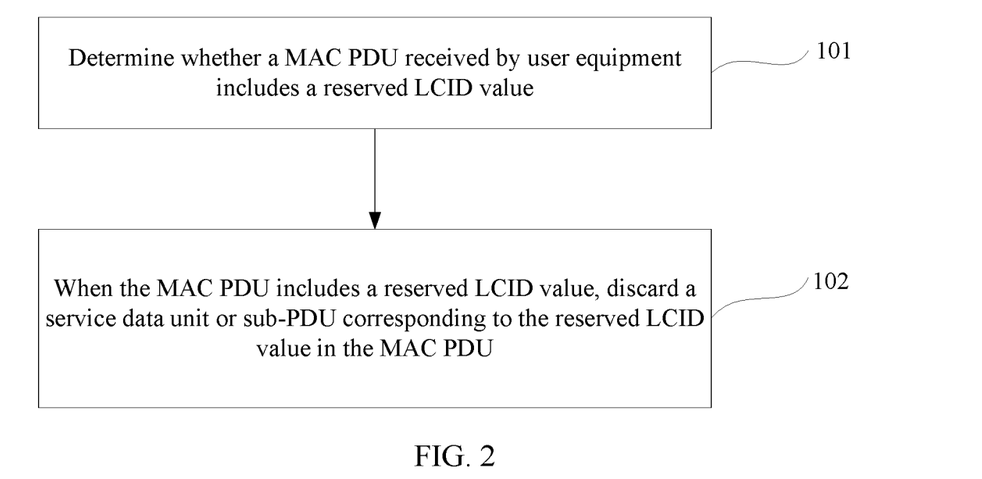
FIG. 2 is a schematic flowchart of a data receiving method according to an embodiment of this disclosure.

An embodiment of this disclosure provides a data receiving method, applied to user equipment. As shown in FIG. 2, the method includes:

Step 101: Determine whether a MAC PDU received by the user equipment includes a reserved LCID value.

Step 102: When the MAC PDU includes a reserved LCID value, discard a SDU or sub-PDU corresponding to the reserved LCID value in the MAC PDU.

In this embodiment, when the MAC PDU received by the user equipment includes the reserved LCID value, the SDU or sub-PDU corresponding to the reserved LCID value in the MAC PDU instead of the entire MAC PDU is discarded. This does not cause a decrease in data reception performance of the user equipment, thereby ensuring the data reception performance of the user equipment. According to the technical solution in this embodiment, it can be realized that data packet reception performance of peer user equipment is not affected when the user equipment activates the data packet duplication function to send a service data packet, thereby ensuring backward compatibility and performance of a communications system.

In a specific implementation, the MAC PDU includes one MAC header and at least one SDU, the MAC header includes a plurality of MAC subheaders, where one of the subheaders identifies a Sidelink Shared Channel (SL-SCH), and each of remaining subheaders corresponds to one SDU; and discarding an SDU corresponding to the reserved LCID value in the MAC PDU includes:

discarding a MAC subheader including the reserved LCID value and an SDU corresponding to the MAC subheader.

In another specific implementation, the MAC PDU includes at least one sub-PDU, the sub-PDU includes one MAC subheader identifying an SL-SCH or includes one MAC subheader and one SDU, and discarding a sub-PDU corresponding to the reserved LCID value in the MAC PDU includes:

discarding a sub-PDU to which a MAC subheader including the reserved LCID value belongs.

In addition, the method further includes:

discarding remaining sub-PDUs following the sub-PDU in the MAC PDU.

Figure 3:
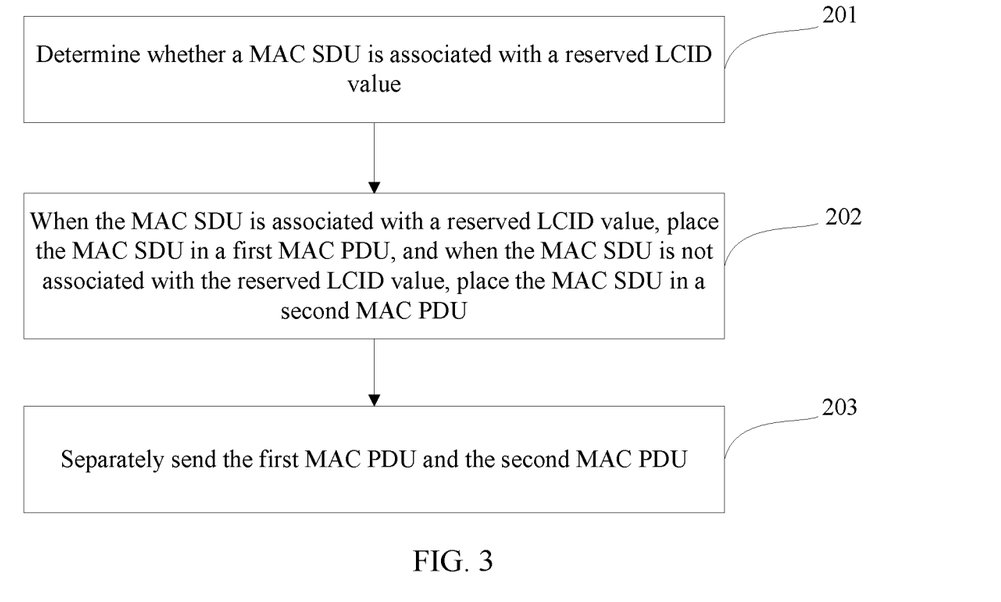
FIG. 3 is a schematic flowchart of a data sending method according to an embodiment of this disclosure.

An embodiment of this disclosure further provides a data sending method, applied to user equipment. As shown in FIG. 3, the method includes:

Step 201: Determine whether a MAC SDU is associated with a reserved LCID value.

Step 202: When the MAC SDU is associated with a reserved LCID value, place the MAC SDU in a first MAC PDU, and when the MAC SDU is not associated with the reserved LCID value, place the MAC SDU in a second MAC PDU.

Step 203: Separately send the first MAC PDU and the second MAC PDU.

In this embodiment, when the user equipment sends data, the MAC SDU associated with the reserved LCID value and the MAC SDU not associated with the reserved LCID value are separately sent in two MAC PDUs. This can prevent peer user equipment from discarding the MAC SDU not associated with the reserved LCID value after receiving the MAC PDU including the reserved LCID value, thereby further ensuring the data reception performance of the user equipment. According to the technical solution in this disclosure, it can be realized that data packet reception performance of the peer user equipment is not affected when the user equipment activates the data packet duplication function to send a service data packet, thereby ensuring backward compatibility and performance of a communications system.

Further, the method specifically includes:

after the user equipment activates a data packet duplication function, determining whether the MAC SDU is associated with the reserved LCID value;

assembling a MAC subheader including the reserved LCID value and an SDU corresponding the MAC subheader into the first MAC PDU, and assembling a MAC subheader not including the reserved LCID value (that is, a MAC subheader including an already defined LCID value) and an SDU corresponding the MAC subheader into the second MAC PDU; and sending the first MAC PDU and the second MAC PDU through different HARQ entities.

The data sending method and the data receiving method in the embodiments are applicable not only to sidelink user equipment in a Long Term Evolution (LTE) system, but also to MAC layer data processing of sidelink user equipment of a New Radio (NR) system.

The data receiving method and data sending method of this disclosure are described in detail below with reference to specific embodiments.

Embodiment 1

In this embodiment, receiving behavior of sidelink user equipment is enhanced. The sidelink user equipment receives a MAC PDU shown in FIG. 4. The MAC PDU includes one MAC header and a plurality of MAC SDUs. Optionally, the MAC PDU further includes a padding part for length byte alignment of the MAC PDU. The MAC header includes a plurality of MAC subheaders. One subheader identifies an SL-SCH, and each of remaining subheaders corresponds to one MAC SDU. When the MAC PDU includes the padding, correspondingly, the MAC header further includes a padding subheader.

Figure 4:
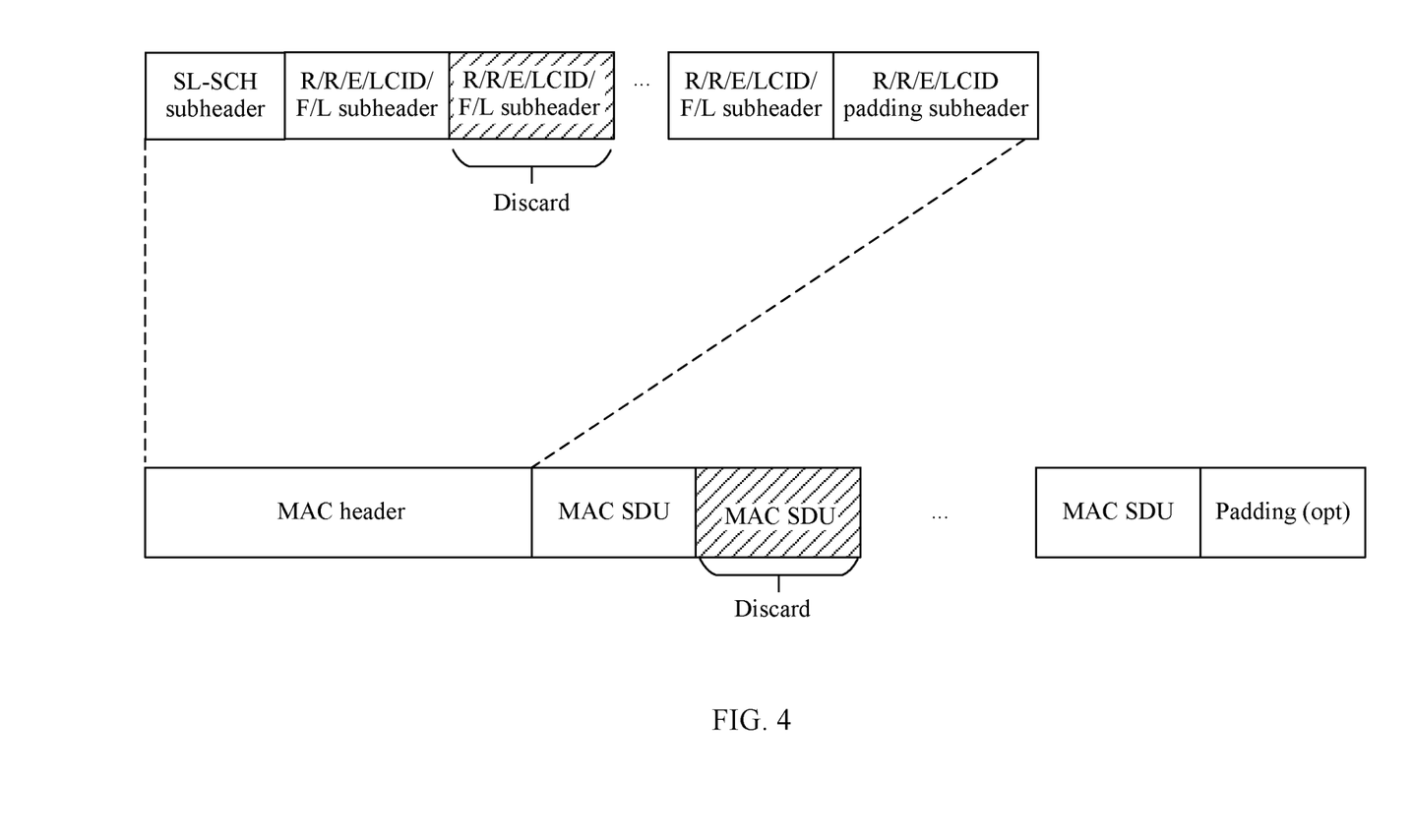
FIG. 4 is a schematic diagram of discarding a MAC SDU and a MAC subheader according to Embodiment 1 of this disclosure.

In this embodiment, when receiving the MAC PDU shown in FIG. 4, the sidelink user equipment first determines whether the MAC PDU includes a reserved LCID value. When the MAC PDU includes a reserved LCID value, the sidelink user equipment discards one or more MAC subheaders including the reserved LCID value and corresponding one or more MAC SDUs. In the example shown in FIG. 4, the sidelink user equipment discards the MAC subheader and the MAC SDU with slashes.

Embodiment 2

In this embodiment, receiving behavior of sidelink user equipment is enhanced. The sidelink user equipment receives a MAC PDU shown in FIG. 5. The MAC PDU includes at least two sub-PDUs. One sub-PDU includes only a subheader for identifying an SL-SCH, and each of other sub-PDUs includes one MAC subheader and one SDU. Optionally, the MAC PDU further includes a padding part for length byte alignment of the MAC PDU or MAC sub-PDU.

Figure 5:
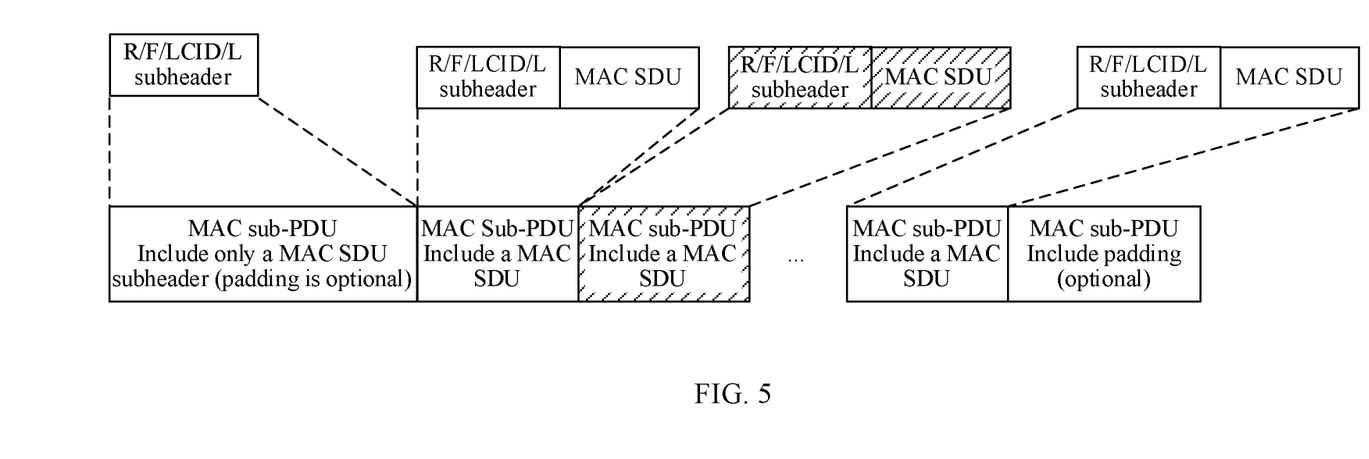
FIG. 5 is a schematic diagram of discarding a MAC sub-PDU according to Embodiment 2 of this disclosure.

In this embodiment, when receiving the MAC PDU shown in FIG. 5, the sidelink user equipment first determines whether a MAC sub-PDU includes a reserved LCID value. When the MAC sub-PDU includes the reserved LCID value, the sidelink user equipment discards the sub-PDU to which a MAC subheader including the reserved LCID value belongs and remaining one or more MAC sub-PDUs. In the example shown in FIG. 5, the sidelink user equipment discards the MAC sub-PDU with slashes and a plurality of remaining MAC sub-PDUs.

Embodiment 3

Figure 6:
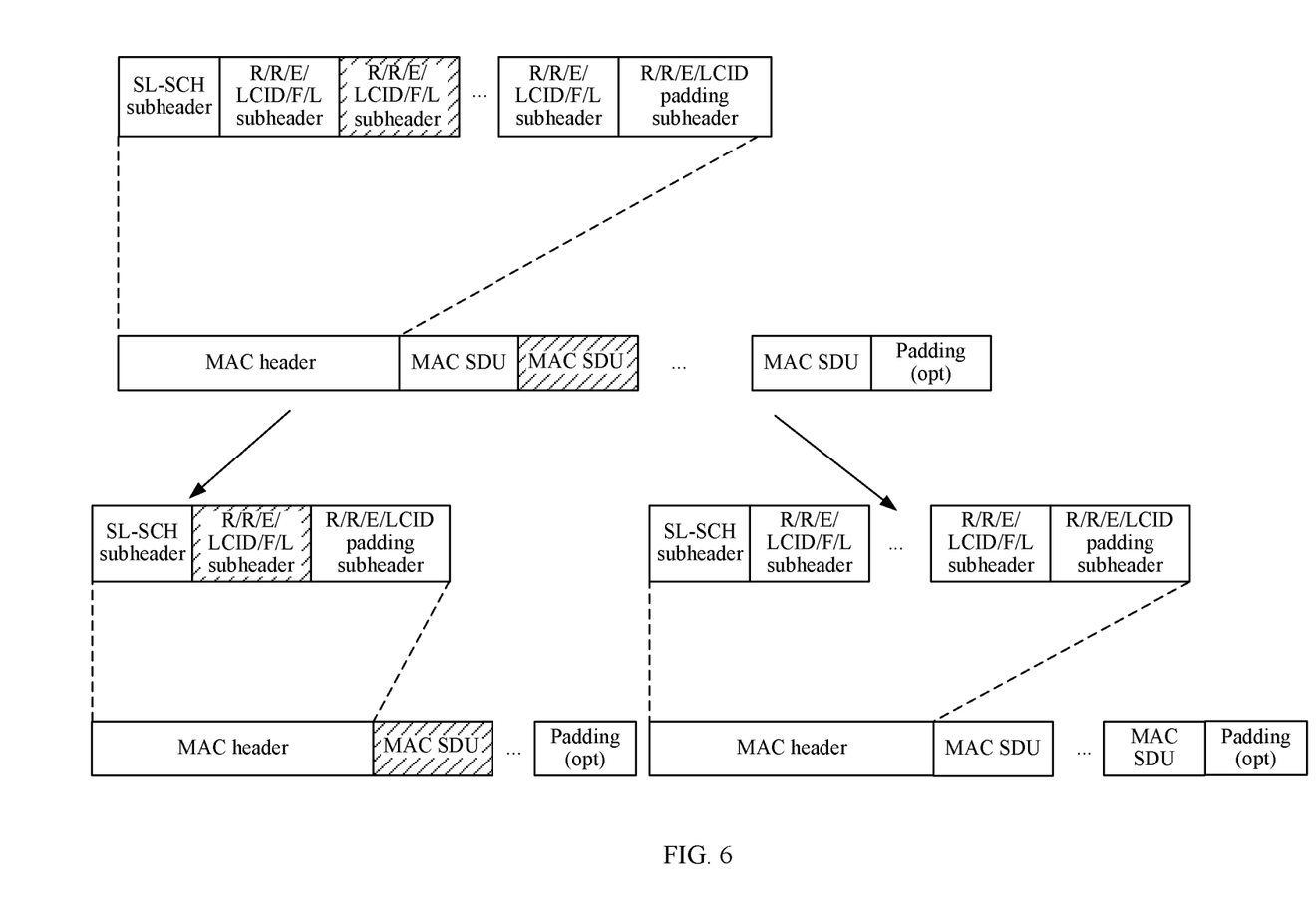
FIG. 6 is a schematic diagram of separately sending MAC SDUs according to Embodiment 3 of this disclosure.

In this embodiment, sending behavior of sidelink user equipment is enhanced. A MAC SDU including a reserved LCID for duplication and a MAC SDU not including the reserved LCID for duplication are separately placed into two MAC PDUs for transmission. As shown in FIG. 6, when the sidelink UE activates a packet duplication function, the UE assembles one or more MAC subheaders (that is, the part with slashes in FIG. 6) including the reserved LCID value for duplication and corresponding one or more MAC SDUs (that is, the part with slashes in FIG. 6) into one MAC PDU; and assembles one or more MAC subheaders including legacy LCID values (which are used for duplication and non-duplication) and corresponding one or more MAC SDUs into another MAC PDU. Then, the UE transmits the two MAC PDUs resulting from encapsulation through different HARQ entities. Optionally, the MAC PDU further includes a padding part for length byte alignment of the MAC PDU.

Figure 7:
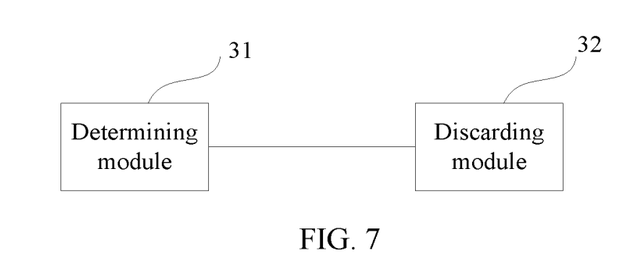
FIG. 7 is a schematic structural diagram of user equipment according to an embodiment of this disclosure.

An embodiment of this disclosure further provides user equipment, which, as shown in FIG. 7, includes:
 a determining module 31, configured to determine whether a MAC PDU received by the user equipment includes a reserved LCID value; and
 a discarding module 32, configured to: when the MAC PDU includes a reserved LCID value, discard an SDU or a sub-PDU corresponding to the reserved LCID value in the MAC PDU.

In this embodiment, when the MAC PDU received by the user equipment includes the reserved LCID value, the SDU or sub-PDU corresponding to the reserved LCID value in the MAC PDU instead of the entire MAC PDU is discarded. This does not cause a decrease in data reception performance of the user equipment, thereby ensuring the data reception performance of the user equipment. According to the technical solution in this embodiment, it can be realized that data packet reception performance of peer user equipment is not affected when the user equipment activates the data packet duplication function to send a service data packet, thereby ensuring backward compatibility and performance of a communications system.

In a specific implementation, the MAC PDU includes one MAC header and at least one SDU, the MAC header including a plurality of MAC subheaders, where one of the subheaders identifies a sidelink shared channel, and each of remaining subheaders corresponds to one SDU; and the discarding module 32 is specifically configured to discard a MAC subheader including the reserved LCID value and an SDU corresponding to the MAC subheader.

In another specific implementation, the MAC PDU includes at least one sub-PDU, the sub-PDU includes one MAC subheader identifying an SL-SCH or includes one MAC subheader and one SDU, and the discarding module 32 is specifically configured to discard a sub-PDU to which a MAC subheader including the reserved LCID value belongs.

Further, the discarding module 32 is further configured to discard remaining sub-PDUs following the sub-PDU in the MAC PDU.

Figure 8:
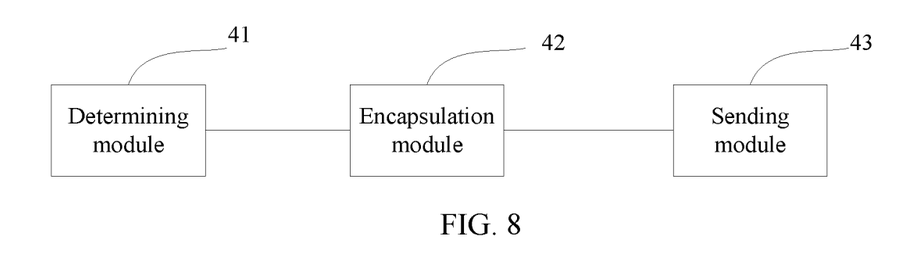
FIG. 8 is a schematic structural diagram of user equipment according to another embodiment of this disclosure.

An embodiment of this disclosure further provides user equipment, which, as shown in FIG. 8, includes:
 a determining module 41, configured to determine whether a MAC SDU is associated with a reserved LCID value;
 an encapsulation module 42, configured to: when the MAC SDU is associated with a reserved LCID value, place the MAC SDU in a first MAC PDU, and when the MAC SDU is not associated with the reserved LCID value, place the MAC SDU in a second MAC PDU; and
 a sending module 43, configured to separately send the first MAC PDU and the second MAC PDU.

In this embodiment, when the user equipment sends data, the MAC SDU associated with the reserved LCID value and the MAC SDU not associated with the reserved LCID value are separately sent in two MAC PDUs. This can prevent peer user equipment from discarding the MAC SDU not associated with the reserved LCID value after receiving the MAC PDU including the reserved LCID value, thereby further ensuring the data reception performance of the user equipment. According to the technical solution in this disclosure, it can be realized that data packet reception performance of the peer user equipment is not affected when the user equipment activates the data packet duplication function to send a service data packet, thereby ensuring backward compatibility and performance of a communications system.

Further, the determining module 41 is specifically configured to: after the user equipment activates a data packet duplication function, determine whether the MAC SDU is associated with the reserved LCID value;

the encapsulation module 42 is specifically configured to assemble a MAC subheader including the reserved LCID value and an SDU corresponding the MAC subheader into the first MAC PDU, and assemble a MAC subheader not including the reserved LCID value and an SDU corresponding the MAC subheader into the second MAC PDU; and the sending module 43 is specifically configured to send the first MAC PDU and the second MAC PDU through different HARQ entities.

An embodiment of this disclosure further provides user equipment, including a memory, a processor, and a computer program that is stored in the memory and capable of running on the processor, where when the computer program is executed by the processor, the steps of the data receiving method or the data sending method are implemented.

Figure 9:
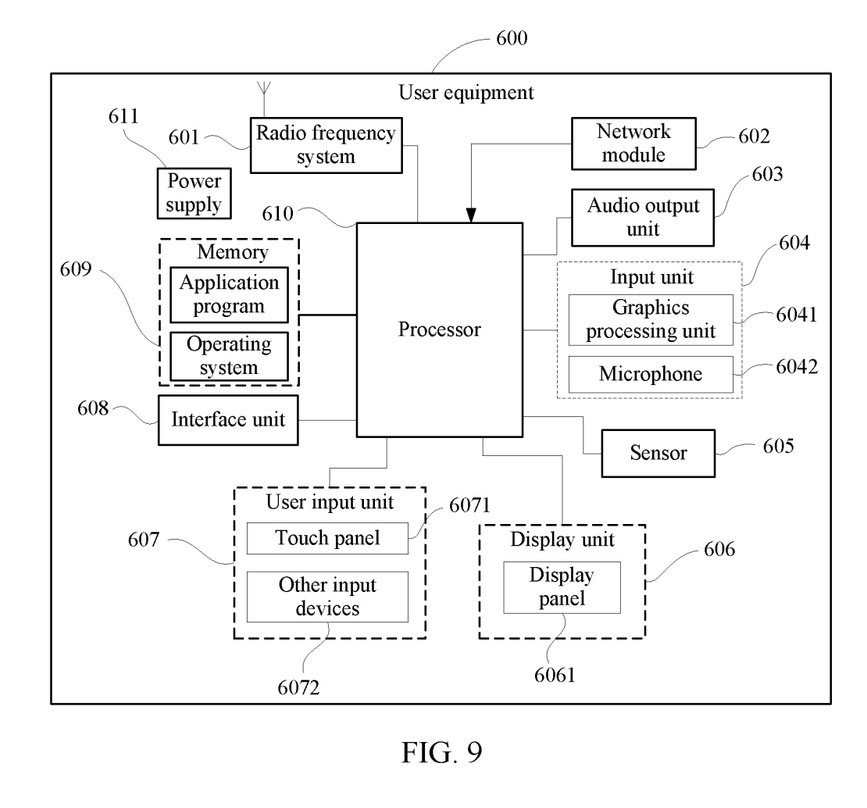
FIG. 9 is a schematic diagram of composition of user equipment according to an embodiment of this disclosure.

FIG. 9 is a schematic diagram of a hardware structure of user equipment for implementing various embodiments of this disclosure. Referring to FIG. 9, the user equipment 600 includes, but is not limited to, components such as a radio frequency unit 601, a network module 602, an audio output unit 603, an input unit 604, a sensor 605, a display unit 606, a user input unit 607, an interface unit 608, a memory 609, a processor 610, and a power supply 611. Persons skilled in the art can understand that the structure of the user equipment shown in FIG. 9 does not constitute any limitation on the user equipment. The user equipment may include more or fewer components than those shown in the figure, or may combine some components, or may have a different component arrangement. In this embodiment of this disclosure, the user equipment includes, but is not limited to, a mobile phone, a tablet computer, a laptop computer, a personal digital assistant, a vehicle-mounted terminal, a wearable device, a pedometer, and the like.

The processor 610 is configured to determine whether a MAC PDU received by the user equipment includes a reserved LCID value; and when the MAC PDU includes a reserved LCID value, discard an SDU or sub-PDU corresponding to the reserved LCID value in the MAC PDU.

Further, the MAC PDU includes one MAC header and at least one SDU, the MAC header including a plurality of MAC subheaders, where one of the subheaders identifies a sidelink shared channel, and each of remaining subheaders corresponds to one SDU; and the processor 610 is specifically configured to discard a MAC subheader including the reserved LCID value and an SDU corresponding to the MAC subheader.

Further, the MAC PDU includes at least one sub-PDU, the sub-PDU includes one MAC subheader identifying an SL-SCH or includes one MAC subheader and one SDU, and the processor 610 is specifically configured to discard a sub-PDU to which a MAC subheader including the reserved LCID value belongs.

Further, the processor 610 is specifically configured to discard remaining sub-PDUs following the sub-PDU in the MAC PDU.

Further, the processor 610 is further configured to: determine whether the MAC SDU is associated with a reserved LCID value; when the MAC SDU is associated with a reserved LCID value, place the MAC SDU in a first MAC PDU, and when the MAC SDU is not associated with the reserved LCID value, place the MAC SDU in a second MAC PDU; and separately send the first MAC PDU and the second MAC PDU.

Further, the processor 610 is specifically configured to: after the user equipment activates a data packet duplication function, determine whether the MAC SDU is associated with the reserved LCID value; assemble a MAC subheader including the reserved LCID value and an SDU corresponding the MAC subheader into the first MAC PDU, and assemble a MAC subheader not including the reserved LCID value and an SDU corresponding the MAC subheader into the second MAC PDU; and send the first MAC PDU and the second MAC PDU through different HARQ entities.

It should be understood that in this embodiment of this disclosure, the radio frequency circuit 601 may be configured to receive and send information, or receive and send a signal in a call process. Specifically, after receiving downlink data from a base station, the radio frequency unit 601 sends the downlink data to the processor 610 for processing, and sends uplink data to the base station. Generally, the radio frequency unit 601 includes, but is not limited to, an antenna, at least one amplifier, a transceiver, a coupler, a low noise amplifier, a duplexer, and the like. In addition, the radio frequency unit 601 may also communicate with a network and another device through a wireless communications system.

The user equipment provides a user with wireless broadband Internet access by using the network module 602, for example, helping the user send and receive emails, browse web pages, or access streaming media.

The audio output unit 603 may convert audio data received by the radio frequency unit 601 or the network module 602 or stored in the memory 609 into an audio signal and output a sound. Moreover, the audio output unit 603 may also provide an audio output (for example, a call signal reception sound or a message reception sound) related to a specific function performed by the user equipment 600. The audio output unit 603 includes a speaker, a buzzer, a receiver, or the like.

The input unit 604 is configured to receive an audio signal or a video signal. The input unit 604 may include a Graphics Processing Unit (GPU) 6041 and a microphone 6042. The graphics processing unit 6041 is configured to process a still image or video image data obtained by an image capture apparatus (for example, a camera) in a video capture mode or an image capture mode. A processed image frame may be displayed on the display unit 606. The image frame processed by the graphics processing unit 6041 may be stored in the memory 609 (or another storage medium) or sent by using the radio frequency unit 601 or the network module 602. The microphone 6042 can receive sounds and process such sounds into audio data. The processed audio data can be converted, in a telephone call mode, into a format output that can be sent to a mobile communications base station through the radio frequency unit 601.

The user equipment 600 further includes at least one sensor 605, such as a light sensor, a motion sensor, and another sensor. Specifically, the light sensor includes an ambient light sensor and a proximity sensor. The ambient light sensor may adjust brightness of the display panel 6061 based on luminance of ambient light. The proximity sensor may turn off the display panel 6061 and/or backlight when the user equipment 600 approaches an ear. As a type of motion sensor, an accelerometer sensor may detect accelerations in various directions (usually, three axes), may detect, in a still state, a magnitude and a direction of gravity, and may be configured to recognize a user equipment posture (for example, screen switching between a landscape mode and a portrait mode, related games, and magnetometer posture calibration), implement a vibration recognition related function (for example, a pedometer or a knock), and the like. The sensor 605 may further include a fingerprint sensor, a pressure sensor, an iris sensor, a molecular sensor, a gyroscope, a barometer, a hygrometer, a thermometer, an infrared sensor, or the like. Details are not described herein.

The display unit 606 is configured to display information entered by the user or provided to the user. The display unit 606 may include a display panel 6061. The display panel 6061 may be configured in a form of a Liquid Crystal Display (LCD), an Organic Light-Emitting Diode (OLED), or the like.

The user input unit 607 may be configured to receive entered digit or character information, and generate a key signal input related to a user setting and function control of the user equipment. Specifically, the user input unit 607 includes a touch panel 6071 and other input devices 6072. The touch panel 6071, also referred to as a touchscreen, may collect a touch operation performed by the user on or near it (for example, an operation performed by the user on or near the touch panel 6071 by using any proper object or accessory such as a finger and a stylus). The touch panel 6071 may include two parts: a touch detection apparatus and a touch controller. The touch detection apparatus detects a touch orientation of the user, detects a signal brought by the touch operation, and transfers the signal to the touch controller. The touch controller receives touch information from the touch detection apparatus, converts the touch information to contact coordinates, and sends the contact coordinates to the processor 610; and receives and executes a command sent by the processor 610. In addition, the touch panel 6071 may be implemented in various types, such as a resistive type, a capacitive type, an infrared type, and a surface acoustic wave type. In addition to the touch panel 6071, the user input unit 607 may further include the other input devices 6072. Specifically, the other input devices 6072 may include, but are not limited to, a physical keyboard, a function key (for example, a volume control key or an on/off key), a trackball, a mouse, or a joystick. Details are not described herein.

Further, the touch panel 6071 may cover the display panel 6061. After detecting a touch operation on or near the touch panel 6071, the touch panel 6071 transmits information about the touch operation to the processor 610 to determine a type of a touch event, and then the processor 610 provides a corresponding visual output on the display panel 6061 based on the type of the touch event. In FIG. 9, the touch panel 6071 and the display panel 6061 are used as two independent parts to implement input and output functions of the user equipment. In some embodiments, however, the touch panel 6071 and the display panel 6061 may be integrated to implement the input and output functions of the user equipment. Details are not limited herein.

The interface unit 608 is an interface between the external apparatus and the user equipment 600. For example, the external apparatus may include a wired or wireless headphone port, an external power (or a battery charger) port, a wired or wireless data port, a memory card port, a port for connecting an apparatus with a recognition module, an audio input/output (I/O) port, a video I/O port, an earphone port, or the like. The interface unit 608 may be configured to receive an input (for example, data information or power) from the external apparatus and transmit the received input to one or more elements of the user equipment 600, or transmit data between the external apparatus and the user equipment 600.

The memory 609 may be configured to store a software program and various data. The memory 609 may mainly include a program storage area and a data storage area. The program storage area may store an operating system, an application program required for at least one function (for example, a sound play function and an image play function), and the like. The data storage area may store data (for example, audio data and a phone book) created based on use of the mobile phone, and the like. In addition, the memory 609 may include a high-speed random access memory, or may include a non-volatile memory such as at least one disk storage device, a flash memory device, or another volatile solid-state storage device.

The processor 610, as a control center of the user equipment, is connected to all parts of the entire user equipment by using various interfaces and lines. By running or executing a software program and/or module that is stored in the memory 609 and invoking data stored in the memory 609, the processor 610 executes various functions of the user equipment and processes data, so as to perform overall monitoring on the user equipment. The processor 610 may include one or more processing units. In some embodiments, an application processor and a modem processor may be integrated into the processor 610. The application processor mainly processes an operating system, a user interface, an application program, and the like. The modem processor mainly processes wireless communication. It can be understood that the modem processor may alternatively not be integrated into the processor 610.

The user equipment 600 may further include the power supply 611 (for example, a battery) that supplies power to all the components. In some embodiments, the power supply 611 may be logically connected to the processor 610 through a power management system, so as to implement functions, such as charge management, discharge management, and power consumption management, by using the power management system.

In addition, the user equipment 600 includes some functional modules not shown. Details are not described herein.

In this embodiment, when the MAC PDU received by the user equipment includes the reserved LCID value, the SDU or sub-PDU corresponding to the reserved LCID value in the MAC PDU instead of the entire MAC PDU is discarded. This does not cause a decrease in data reception performance of the user equipment, thereby ensuring the data reception performance of the user equipment. In addition, when the user equipment sends data, the MAC SDU associated with the reserved LCID value and the MAC SDU not associated with the reserved LCID value are separately sent in two MAC PDUs. This can prevent peer user equipment from discarding the MAC SDU not associated with the reserved LCID value after receiving the MAC PDU including the reserved LCID value, thereby further ensuring the data reception performance of the user equipment. According to the technical solution in this disclosure, it can be realized that data packet reception performance of the peer user equipment is not affected when the user equipment activates the data packet duplication function to send a service data packet, thereby ensuring backward compatibility and performance of a communications system.

An embodiment of this disclosure further provides a computer-readable storage medium, where the computer-readable storage medium stores a computer program, and when the computer program is executed by a processor, the steps of the data receiving method or the data sending method are implemented.

It can be understood that the embodiments described herein may be implemented by hardware, software, firmware, middleware, microcode, or a combination thereof. For hardware implementation, the processing unit may be implemented in one or more Application Specific Integrated Circuits (ASIC), a Digital Signal Processor (DSP), a Digital Signal Processing Device (DSPD), a Programmable Logic Device (PLD), a Field-Programmable Gate Array (FPGA), a general-purpose processor, a controller, a microcontroller, a microprocessor, another electronic unit for performing the functions described in this application, or a combination thereof.

For software implementation, the technology described herein may be implemented by executing modules (for example, procedures and functions) of the functions described herein. The software code may be stored in the memory and executed by the processor. The memory may be implemented inside or outside the processor.

The embodiments in this specification are all described in a progressive manner. Each embodiment focuses on its difference from other embodiments. For the same or similar parts in the embodiments, mutual reference may be made.

Persons skilled in the art should understand that the embodiments of this disclosure may be provided as a method, an apparatus, or a computer program product. Therefore, the embodiments of this disclosure may be hardware-only embodiments, software-only embodiments, or embodiments with a combination of software and hardware. Moreover, in the embodiments of this disclosure, a form of a computer program product that is implemented on one or more computer-usable storage media (including but not limited to a disk memory, a CD-ROM, an optical memory, and the like) includes computer usable program code.

The embodiments of this disclosure are described with reference to the flowcharts and/or block diagrams of the method, the user equipment (system), and the computer program product according to the embodiments of this disclosure. It should be understood that computer program instructions may be used to implement each process and/or each block in the flowcharts and/or the block diagrams, or a combination of a process and/or a block in the flowcharts and/or the block diagrams. These computer program instructions may be provided to a general-purpose computer, a special-purpose computer, an embedded processor, or a processor of any other programmable data processing user equipment to generate a machine, so that the instructions executed by a computer or a processor of any other programmable data processing user equipment generate an apparatus for implementing a specific function in one or more processes in the flowcharts and/or in one or more blocks in the block diagrams.

These computer program instructions may be stored in a computer-readable memory that can guide the computer or any other programmable data processing user equipment to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or other programmable data processing user equipment, so that a series of operations and steps are performed on the computer or the other programmable user equipment, thereby generating computer-implemented processing. Therefore, the instructions executed on the computer or the other programmable user equipment provide steps for implementing a specific function in one or more processes in the flowcharts and/or in one or more blocks in the block diagrams.

Although some embodiments of this disclosure have been described, persons skilled in the art can make changes and modifications to these embodiments once they learn the basic inventive concept. Therefore, the following claims are intended to be construed as to cover the described embodiments and all changes and modifications falling within the scope of the embodiments of this disclosure.

It should be further noted that in this specification, relational terms such as "first" and "second" are only used to distinguish one entity or operation from another, and do not necessarily require or imply that any actual relationship or sequence exists between these entities or operations. Moreover, the terms "include", "comprise", or any of their variants are intended to cover a non-exclusive inclusion, such that a process, a method, an article, or user equipment that includes a list of elements not only includes those elements but also includes other elements that are not expressly listed, or further includes elements inherent to such a process, method, article, or user equipment. In absence of more constraints, an element preceded by "includes a . . . " does not preclude the existence of other identical elements in the process, method, article, or user equipment that includes the element.

The foregoing descriptions are some implementations of this disclosure. It should be noted that persons of ordinary skill in the art may make several improvements or polishing without departing from the principle of this disclosure and the improvements and polishing shall fall within the protection scope of this disclosure.

What is claimed is:

1. A sidelink user equipment, comprising a memory, a processor, and a computer program that is stored in the memory and capable of running on the processor, wherein the computer program is executed by the processor to perform operations comprising:
   determining whether a Medium Access Control (MAC) Service Data Unit (SDU) is associated with a reserved Logical Channel Identity (LCID) value;
   when the MAC SDU is associated with a reserved LCID value, placing the MAC SDU in a first Protocol Data Unit (MAC PDU), and when the MAC SDU is not associated with the reserved LCID value, placing the MAC SDU in a second MAC PDU; and
   sending both the first MAC PDU and the second MAC PDU as separate MAC PDUs to another sidelink user equipment.

2. The sidelink user equipment according to claim 1, wherein the computer program is executed by the processor to perform operations further comprising:
   after the sidelink user equipment activates a data packet duplication function, determining whether the MAC SDU is associated with the reserved LCID value.

3. The sidelink user equipment according to claim 1, wherein the computer program is executed by the processor to perform operations further comprising:
assembling a MAC subheader comprising the reserved LCID value and an SDU corresponding to the MAC subheader into the first MAC PDU.

4. The sidelink user equipment according to claim 1, wherein the computer program is executed by the processor to perform operations further comprising:
assembling a MAC subheader not comprising the reserved LCID value and an SDU corresponding to the MAC subheader into the second MAC PDU.

5. The sidelink user equipment according to claim 1, wherein the computer program is executed by the processor to perform operations further comprising:
sending the first MAC PDU and the second MAC PDU through different Hybrid Automatic Repeat Request (HARQ) entities.

6. The sidelink user equipment according to claim 1, wherein the first MAC PDU further includes a padding part for length byte alignment of the first MAC PDU.

7. The sidelink user equipment according to claim 1, wherein the second MAC PDU further includes a padding part for length byte alignment of the second MAC PDU.

8. A method performed by sidelink user equipment, comprising:
determining whether a Medium Access Control (MAC) Service Data Unit (SDU) is associated with a reserved Logical Channel Identity (LCID) value;
when the MAC SDU is associated with a reserved LCID value, placing the MAC SDU in a first Protocol Data Unit (MAC PDU), and when the MAC SDU is not associated with the reserved LCID value, placing the MAC SDU in a second MAC PDU; and
sending both the first MAC PDU and the second MAC PDU as separate MAC PDUs to another sidelink user equipment.

9. The method according to claim 8, further comprising:
assembling a MAC subheader comprising the reserved LCID value and an SDU corresponding to the MAC subheader into the first MAC PDU.

10. The method according to claim 8, further comprising:
assembling a MAC subheader not comprising the reserved LCID value and an SDU corresponding to the MAC subheader into the second MAC PDU.

11. The method according to claim 8, further comprising:
sending the first MAC PDU and the second MAC PDU through different Hybrid Automatic Repeat Request (HARQ) entities.

12. The method according to claim 8, wherein the first MAC PDU further includes a padding part for length byte alignment of the first MAC PDU.

13. The method according to claim 8, wherein the second MAC PDU further includes a padding part for length byte alignment of the second MAC PDU.

* * * * *